UNITED STATES PATENT OFFICE.

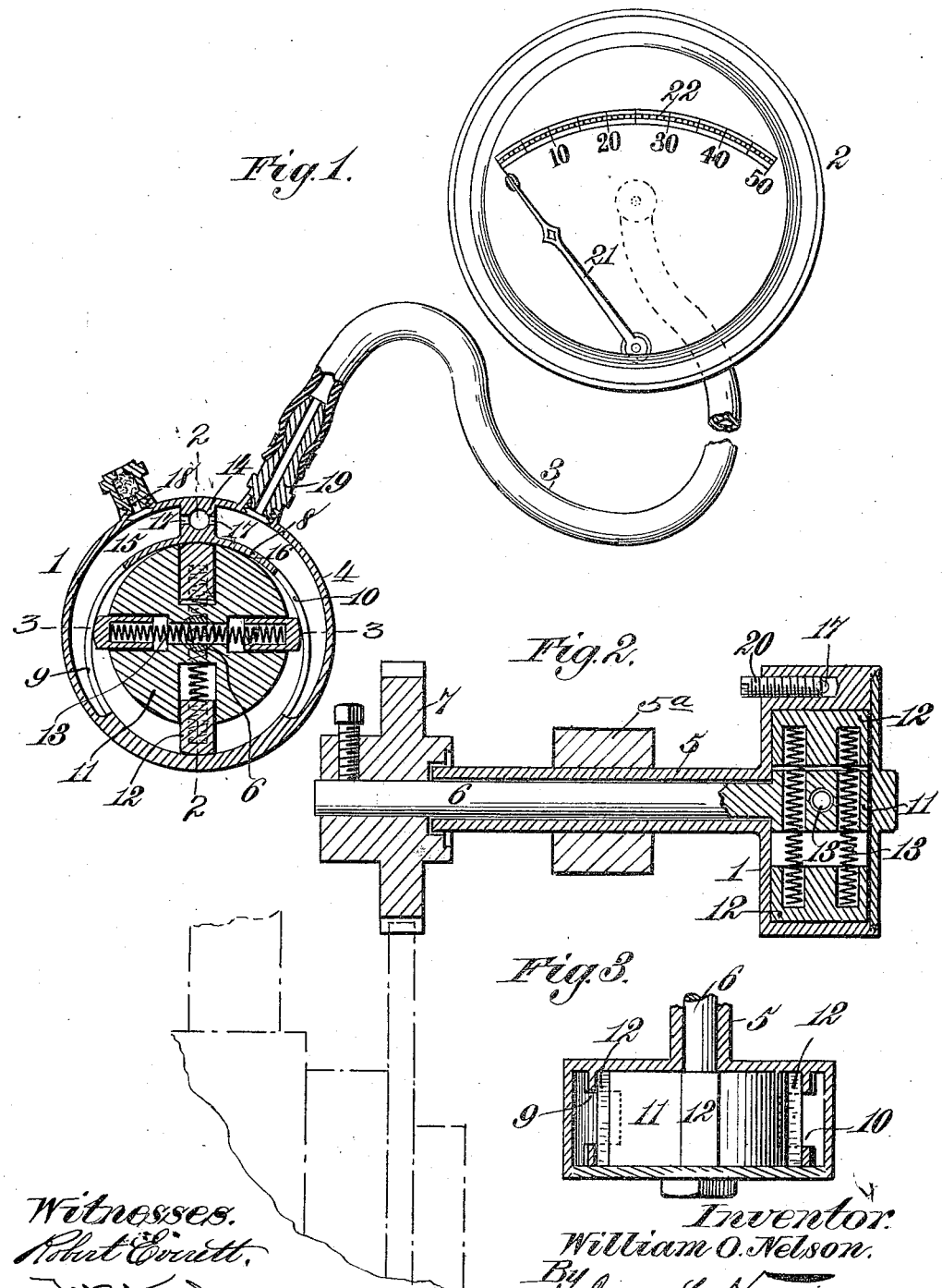

WILLIAM O. NELSON, OF BALTIMORE, MARYLAND.

SPEEDOMETER.

1,052,369.  Specification of Letters Patent.  Patented Feb. 4, 1913.

Application filed March 23, 1909. Serial No. 485,317.

*To all whom it may concern:*

Be it known that I, WILLIAM O. NELSON, a citizen of the United States, residing in Baltimore city and State of Maryland, have invented new and useful Improvements in Speedometers, of which the following is a specification.

My present invention relates to improvements in instruments for determining the speed of vehicles generally and particularly automobiles, and it has for its object primarily to provide an improved instrument of this class that is cheaper and simpler in its construction and one that is more accurate than those heretofore known and wherein a steady or "dead-beat" action of the hand or indicator is attained whereby the indicator may be easily and accurately read, the present invention also obviating certain objectionable features inherent in instruments of this class as heretofore constructed.

More specifically, the invention consists of a generator driven from an appropriate moving part of the vehicle and within which a body of air is caused to circulate steadily or substantially free from pulsations, a throttle or choke passage of unvarying size being formed at one point in the air circuit whereby a pressure is produced at such point which varies in ratios proportionate with the varying speeds of the vehicle, and an indicator is connected to the generator and is operable according to the variations in the said pressure, the opposite side of the choke passage being vented to the atmosphere whereby a greater or less amount of air may be contained in the parts of the instrument according to the variations in the pressure, the instrument when once set or adjusted being automatic and the indicator having a steady or non-vibratory movement whether the speed of the vehicle is constant or increasing or decreasing.

An important advantage of the invention is that the same air circulates constantly within the instrument, excepting at those times when the speed of the vehicle is increasing or decreasing, and hence injury or wear of the instrument due to dust is minimized or eliminated.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a view of a complete speedometer constructed in accordance with the present invention, the air generator being shown in section; Fig. 2 represents an axial section through the air generator and its driving shaft and gear, the section being taken on the line 2—2 of Fig. 1; and Fig. 3 represents a section of the air generator upon the line 3—3 of Fig. 1.

Similar parts are designated by the same reference characters in the several views.

The instrument comprises generally an air generator 1 that is driven from an appropriate part of the vehicle and serves to develop pressures varying according to the different speeds of the vehicle, a suitable indicator 2 in the form of a pressure-gage that is responsive to the variations in the pressure developed by the generator, and a conductor 3 preferably in the form of a flexible fluid-tight tube which serves to connect the generator with the indicator, the latter being placed upon an appropriate part of the vehicle whereby it may be read conveniently. In order to produce an instrument of this class whereby a steady or non-vibratory movement of the indicator may be obtained, I use an air generator that is capable of developing a non-pulsating pressure and at the same time I provide an air generator which uses practically the same air repeatedly, and by thus minimizing the intake of fresh air from the atmosphere, wear and injury to the instrument owing to the entrance of dust contained in such air is minimized or practically eliminated. In the present instance, I have shown a preferred form of air generator which consists of an outer casing 4 which may be mounted non-rotatably upon an appropriate part of the vehicle, it having a tube 5 fixed thereto in the present instance which may be appropriately clamped to the vehicle frame by a suitable bracket 5ᵃ and through this tube extends a shaft 6 one end of which has fixed thereto an operating gear 7 which meshes preferably with an appropriate gear fixed to the hub of one of the vehicle wheels, as indicated in Fig. 2. Within the casing 4 is formed a cylinder 8 which in the present instance is eccentric to the axis of the shaft 6 and has oppositely arranged inlet and outlet ports 9 and 10 therein, these ports being formed in the present instance by peripherally elongated slots of a width less than the width of the cylinder. A piston head 11 is mounted within the cylinder and is rotated by the shaft 6, this piston head having a periphery that is concentric to the axis of the shaft and hence this piston head will be eccentric to the axis of the cylinder and its periphery will form a close fit with one side of the cylinder. The piston head carries an appropriate number of piston slides 12, a set of four being shown in the present instance which operate in radial slots in the piston head and they are pressed against the inner wall of the cylinder by means of compression springs 13. As the cylinder is arranged eccentrically within the casing it forms a space between it and the casing at one side which is divided by a partition 14 forming a pair of compartments 15 and 16 that are connected by a passage 17 which is formed in the partition 14 and permits a circulation of air from the compartment 16 to the compartment 15. The compartment 15 communicates with the atmosphere through a vent 18, this vent being shown as provided with a packing of absorbent material that will filter any air that may enter it and thereby prevent entrance of dust to the instrument. A nipple 19 is connected to the casing so as to communicate with the compartment 16 which is at the opposite side of the partition 14 and the tube 3 which leads to the indicator is fitted to the nipple so that any variations in the pressure of air within the compartment 16 shall be transmitted to the indicator. In order to enable the instrument to be adjusted to wheels of different diameters so that the indicator may properly designate the different speeds at which the vehicle is moving, I provide a throttling valve which will render it possible to vary the area of the choke passage 17 that connects the compartments 15 and 16, a valve in the form of a screw 20 being shown in the present instance that is tapped into one end of the partition 14 and its end serves to obstruct more or less the choke passage 17, the effective size of this choke passage however, after adjustment, remaining constant during the operation of the instrument.

The air generator being driven from the wheel of the vehicle revolves at a speed proportionate to the speed of the vehicle and in the specific form of generator shown, the revolving motion of the piston head will cause the piston slides thereon to take air into the cylinder from the compartment 15 through the inlet port 9 and to exhaust it from the cylinder through the outlet port 10 into the compartment 16, and the air from the compartment 16 is returned to the compartment 15 through the inter-communicating choke passage 17. This passage 17, however, is relatively small and the obstruction formed by it to the circulation of the air will cause the latter to back up in the compartment 16 and thus produce a pressure that increases or decreases according to the increase or decrease in the speed of the vehicle. The indicator which is responsive to variations in the pressure in the compartment 16 owing to the fact that the flexible tube connects it therewith has an appropriate movable part, a hand 21 being shown in the present instance which coöperates with a suitably graduated scale 22, and by reference to the scale and indicator, the speed of the vehicle may be determined whenever desired. It will be obvious that any appropriate indicator may be used which will be responsive to the variations in the pressure of air in the compartment 16, a conventional form of indicator being shown in the present instance.

Obviously, the same air is used repeatedly within the instrument and it is caused to circulate in a circuit starting with the compartment 15, thence passing into the cylinder through the inlet port 9, and after being forced around the cylinder by the piston slides, it passes through the outlet port 10 into the compartment 16 and from the latter it returns to the compartment 15 through the passage 17 which is appropriately choked or throttled, and the tube that connects the compartment 16 of the air generator with the indicator contains air that is under the same pressure as the air contained in said compartment. While the vehicle travels at a constant speed, the same air is used repeatedly or, in other words, no fresh air from the atmosphere is taken into the instrument at least to any appreciable extent, but when the speed of the vehicle increases, obviously the revolving element of the air generator rotates at a higher speed and consequently the choke passage will offer such a resistance to the air escaping from the compartment 16 as to cause a higher pressure of air in this compartment, and the increased pressure of the air that also fills the connecting tube and the interior of the indicator will require a greater volume of air at atmospheric pressure, and the additional air necessary to fill the operative parts of the instrument at high pressure is supplied from the atmosphere through the vent 18. When the speed of the vehicle decreases, the pressure of air in the operative parts thereof will correspondingly fall, and the excess of air due to its expansion may escape to the atmosphere through the vent 18, the air in the compartment 15 being maintained substantially at atmospheric pressure.

The revolving air generator which causes the circulation of the air within it, obviously produces a pressure that is free from pulsations and hence the indicator that is responsive to the pressure variations due to the different speeds of the vehicle will be steady in its movements and non-vibratory, and as there are no large chambers in which the air under pressure is stored, the indicator will respond immediately to the increase or decrease in the speed of the vehicle.

An instrument of this class may be constructed in accordance with the present invention cheaply and, moreover, its simplicity of construction renders it free from breakage or derangement, the use of the flexible shaft common in speedometers of the mechanically-operated class and which is not only expensive but subject to breakage being eliminated. By using a rotary pressure generator of the class described, not only is the driving connection between it and the vehicle wheel simplified, but a non-pulsating pressure is obtainable that insures a steady or non-vibratory action of the indicator and, moreover, it enables practically the same air to be used repeatedly within the instrument so that very little, if any, dust is drawn into it, although the generator accommodates itself automatically to the varying amounts of air used at the different speeds of operation.

Obviously, any desired number of indicators can be connected to and operable by the same generator and placed upon any convenient parts of the vehicle.

I claim as my invention:—

1. An instrument of the class described comprising an air pressure generator embodying a casing having an inlet and an outlet connected by a restricted passage of constant area inclosed by said casing, and an indicator having means connecting it to the outlet of the generator at a point in advance of said restricted passage and responsive to pressure variations.

2. A speedometer comprising a fluid pressure generator having an inlet and an outlet connected by an intercommunicating passage of constant effective area to form a circuit for the fluid within the generator and to develop a pressure at the outlet side thereof, and an indicator having means connecting it directly and freely to the generator at a point between the outlet thereof and said passage and responsive to pressure variations.

3. A speedometer comprising a generator having an air inlet and air outlet connected by a restricted passage of constant area, a revoluble compressing element for producing a circulation of air from said outlet to the inlet and for developing a pressure at the outlet side varying according to the speed of movement of the said element, and an indicator having means connecting it directly to the outlet side of the generator at a point in advance of said restricted passage and responsive to the pressure variations of said fluid.

4. A speedometer comprising a generator embodying a casing having an inlet and outlet connected by an inclosed inter-communicating restricted passage of constant area, an element having means for driving it at speeds varying according to the variations in speed of a vehicle and serving to develop a pressure of air at one side of said passage, a vent being provided for maintaining atmospheric air pressure at the opposite side of said passage, and an indicator having means connecting it to the generator at a point between its outlet and said restricted passage and responsive to variations in the pressure developed thereby.

5. A speedometer comprising a generator embodying a casing having a circuit-like air passage inclosed therein, a compressing element adapted to be driven from a vehicle and capable of developing a non-pulsating flow of air through said passage, said passage being restricted to a fixed degree at a given point to develop a pressure of air therein, and an indicator having means connecting it to said passage in advance of its restriction and responsive to pressure variations therein.

6. A speedometer comprising a pressure generator embodying a casing containing an inlet and an outlet, a compressing element for causing a circulation of air through said inlet and outlet, said casing containing a restricted passage of constant area which connects said inlet, and outlet whereby air from the outlet is returned to the inlet and a pressure is developed in the casing at the outlet side of the generator, and an indicator having means connecting it to the outlet side of the generator and responsive to the variations in the pressure developed thereby.

7. A speedometer comprising a pressure generator embodying a casing having an inlet and an outlet connected by an intercommunicating passage, means within said casing for adjusting the effective area of the said inter-communicating passage to different fixed sizes whereby predetermined pressures will be developed by the generator in accordance with a given speed of operation of the generator, and an indicator having means connecting it to the generator at a point between its outlet and said passage and responsive to variations in the pressures thus developed.

8. A speedometer comprising a pressure generator having a circuit-like conduit provided with a restriction of constant cross-section at a given point, a revoluble element having means for driving it from a vehicle and at speeds varying according to the rates of movement thereof, said element being operable to cause a circulation of air through said conduit and to develop pressure at one side of said restriction, and a suitably graduated indicator having means connecting it freely to the generator at the pressure side of said restriction and responsive to the variations in the pressure developed in the said circuit-like passage.

9. A speedometer comprising a pressure generator which consists of a casing, a cylinder formed therein and having inlet and outlet ports, compartments being formed in the casing and communicating respectively with said ports, a partition separating said compartments and having a passage forming communication between said compartments, a revoluble compressing element mounted in said cylinder and serving to develop a pressure in one of said compartments, and an indicator having means by which it is connected to one compartment and responsive to pressure variations therein.

10. A speedometer comprising a pressure generator including a casing, a sleeve non-rotatable therewith, a supporting bracket adapted to be secured to said sleeve and to a vehicle frame, a revoluble compressing element contained in said casing, an operating shaft for said element journaled in said sleeve and having means for driving it from a vehicle wheel, said casing inclosing the inlet and outlet of said generator and having a circuit-like conduit connecting said inlet and outlet and provided with an intervening restriction, and an indicator having means connecting it to the generator at a point between the outlet thereof and said restriction and responsive to the varying pressures developed thereby.

11. In an instrument of the class described, a rotary fluid pressure generator having an inlet, and a passage of constant area on the discharge side of said generator, said passage being of less capacity than said inlet, and an indicator having means by which it communicates freely and directly with the fluid discharge from said generator, substantially as specified.

12. In an instrument of the class described, an outer casing, a rotary fluid pressure generator located therein having an inlet, said casing having a passage of constant area on the discharge side of said generator, said passage being of less capacity than said inlet, and an indicator having a free and direct fluid connection means with said casing on the discharge side of said generator, substantially as specified.

In testimony whereof I have hereunto set my hand in presence of two subscribing witnesses.

WILLIAM O. NELSON.

Witnesses:
GEO. W. CARRICK,
D. ARDIN CARRICK.

Copies of this patent may be obtained for five cents each, by addressing the "Commissioner of Patents, Washington, D. C."